United States Patent
Boday et al.

(10) Patent No.: US 10,336,897 B2
(45) Date of Patent: *Jul. 2, 2019

(54) TAILORABLE VISCOELASTIC PROPERTIES OF PEG-HEMIAMINAL ORGANOGEL NETWORKS

(71) Applicant: International Business Machines Corporation, Armonk, NY (US)

(72) Inventors: Dylan J. Boday, Tucson, AZ (US); Mareva B. Fevre, San Jose, CA (US); Jeannette M. Garcia, San Leandro, CA (US); James L. Hedrick, Pleasanton, CA (US); Rudy J. Wojtecki, San Jose, CA (US); Mu San Zhang, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/681,057

(22) Filed: Aug. 18, 2017

(65) Prior Publication Data

US 2017/0342212 A1 Nov. 30, 2017

Related U.S. Application Data

(63) Continuation of application No. 14/844,298, filed on Sep. 3, 2015, now Pat. No. 9,758,620.

(51) Int. Cl.
| | | |
|---|---|---|
| C08G 63/02 | (2006.01) | |
| C08L 39/06 | (2006.01) | |
| C08G 65/331 | (2006.01) | |
| C08L 71/02 | (2006.01) | |

(52) U.S. Cl.
CPC ............ *C08L 39/06* (2013.01); *C08G 65/331* (2013.01); *C08L 71/02* (2013.01); *C08G 2650/50* (2013.01); *C08L 2205/025* (2013.01); *C08L 2205/03* (2013.01)

(58) Field of Classification Search
USPC ................. 525/406, 480, 509; 528/149, 249
See application file for complete search history.

(56) References Cited

U.S. PATENT DOCUMENTS

| | | |
|---|---|---|
| 2,889,277 A | 6/1959 | Hughes |
| 3,340,232 A | 9/1967 | Smith et al. |
| 3,598,748 A | 8/1971 | Hirosawa |
| 3,957,742 A | 5/1976 | Kveton |
| 3,969,300 A | 7/1976 | Nagata et al. |
| 4,003,864 A | 1/1977 | Roth et al. |
| 4,106,904 A | 8/1978 | Oude Alink et al. |
| 4,160,754 A | 7/1979 | Schapel et al. |
| 4,224,417 A | 9/1980 | Hajek et al. |
| 4,225,481 A | 9/1980 | Wagner |
| 4,246,160 A | 1/1981 | Wagner et al. |
| 4,301,262 A | 11/1981 | Wagner et al. |
| 4,877,451 A | 10/1989 | Winnik et al. |
| 5,002,830 A | 3/1991 | Gillis et al. |
| 5,010,144 A | 4/1991 | Phanstiel, IV et al. |
| 5,089,567 A | 2/1992 | Phanstiel et al. |
| 5,112,796 A | 5/1992 | Iannicelli |
| 5,210,191 A | 5/1993 | Phanstiel et al. |
| 5,674,377 A | 10/1997 | Sullivan, III et al. |
| 5,830,243 A | 11/1998 | Wolak et al. |
| 8,841,134 B2 | 9/2014 | Papineni et al. |
| 8,907,049 B2 | 12/2014 | Baidak et al. |
| 8,980,278 B2 | 3/2015 | Steinberg et al. |
| 8,980,295 B2 | 3/2015 | Kao et al. |
| 2004/0048782 A1 | 3/2004 | Bryson |
| 2004/0209987 A1 | 10/2004 | Gajiwala |
| 2005/0089744 A1 | 4/2005 | Kim et al. |
| 2007/0031498 A1 | 2/2007 | Zong et al. |
| 2008/0014438 A1 | 1/2008 | Ruhle et al. |
| 2009/0039018 A1 | 2/2009 | Jordi et al. |
| 2010/0107476 A1 | 5/2010 | Cosimbescu |
| 2011/0114493 A1 | 5/2011 | Macnamara et al. |
| 2012/0049308 A1 | 3/2012 | Nishimura et al. |
| 2013/0204010 A1 | 8/2013 | Grinstaff et al. |
| 2014/0058047 A1 | 2/2014 | Grinstaff et al. |
| 2015/0084232 A1 | 3/2015 | Rutz et al. |
| 2015/0104579 A1 | 4/2015 | Hedrick et al. |
| 2015/0148488 A1 | 5/2015 | Greger et al. |
| 2016/0046831 A1 | 2/2016 | Boday et al. |
| 2017/0066878 A1 | 3/2017 | Boday et al. |

*Primary Examiner* — Terressa Boykin

(74) *Attorney, Agent, or Firm* — Patterson + Sheridan, LLP

(57) ABSTRACT

Methods, compounds, and compositions described herein generally relate to hemiaminal organogel networks (HDCNs) and methods of forming HDCNs. In some embodiments, a hemiaminal organogel has a plurality of first polymers, each having a first end and a second end, a plurality of second polymers, each having a first end and a second end, and a plurality of trivalent aminal-hemiaminal linkages. The first end of each polymer of the plurality of first polymers may be covalently bonded to a first trivalent aminal-hemiaminal linkage. The second end of each polymer of the plurality of first polymers may be covalently bonded to a second trivalent aminal-hemiaminal linkage. The first end of each polymer of the plurality of second polymers may be covalently bonded to one of the plurality of trivalent aminal-hemiaminal linkages. The second end of each polymer of the plurality of second polymers may be non-covalently bonded.

20 Claims, 4 Drawing Sheets

TAILORABLE VISCOELASTIC PROPERTIES OF PEG-HEMIAMINAL ORGANOGEL NETWORKS

CROSS-REFERENCE TO RELATED APPLICATIONS

This application is a continuation of U.S. application Ser. No. 14/844,298 filed Sep. 3, 2015. The above-mentioned application is hereby incorporated by reference.

FIELD

Embodiments described herein generally relate to hemiaminal organogel networks (HDCNs) and methods of forming HDCNs.

BACKGROUND

Thermosets having desirable properties for use as sealants, composite repair, 3D printing material, and other applications, are in high demand. 3D printing applications in particular have attracted attention for their potential as a new manufacturing process that offers remarkable versatility in producing tailored physical objects from the micro- to the macroscale. Modern advances in 3D printing have produced 3D printers for personal home use, rapid prototyping and production of biomedical devices. In its basic form, a 3D-printing apparatus consists of a deposition nozzle/needle that is connected to a reservoir containing the material to be deposited. Accordingly, the material to be deposited should be shear-thinning enough to flow through a general syringe and/or nozzle of a 3D printer. Furthermore, it may be useful in some cases that the physical object printed by the 3D printer be modifiable post-depostion.

Thermosets generally have material networks consisting of irreversible covalent crosslink junctions that do not reform following a mechanical failure. Recent advances in materials sciences have focused on developing rearrangeable networks and crosslink junctions. However, an inherent problem with continuously reversible (supramolecular) systems is that they suffer from creep due to thermal fluctuations of non-covalent linkages, which eventually leads to material failure. The deleterious effects of creep may be mitigated by the introduction of covalent crosslinks.

Furthermore, traditional materials utilized as print media are generally prepared at high temperature, but the liquid monomers used as polymerizable solvents for material synthesis are not stable at high temperature.

Therefore, there is a need in the art for a thermoset material with finely tuned mechanical properties, i.e. behavior under shear loading, favorable melt-processing capabilities, and syntheses of such material to be performed at lower temperatures within a smaller time period.

SUMMARY

Embodiments described herein generally relate to hemiaminal organogel networks (HDCNs) and methods of forming HDCNs.

In some embodiments, a hemiaminal organogel has a plurality of first polymers, each having a first end and a second end, a plurality of second polymers, each having a first end and a second end, and a plurality of trivalent aminal-hemiaminal linkages. The first end of each polymer of the plurality of first polymers may be covalently bonded to a first trivalent aminal-hemiaminal linkage of the plurality of trivalent aminal-hemiaminal linkages. The second end of each polymer of the plurality of first polymers may be covalently bonded to a second trivalent aminal-hemiaminal linkage of the plurality of trivalent aminal-hemiaminal linkages. The first end of each polymer of the plurality of second polymers may be covalently bonded to one of the plurality of trivalent aminal-hemiaminal linkages. The second end of each polymer of the plurality of second polymers may be non-covalently bonded.

In other embodiments, a hemiaminal organogel has a plurality of polymer chains, each having an α end and an ω end, and a plurality of aminal-hemiaminal linkages. A first portion of the plurality of polymer chains may be each covalently bonded to a first aminal-hemiaminal linkage at the α end and a second aminal-hemiaminal linkage at the ω end. A second portion of the plurality of the polymer chains may be each covalently bonded to a first aminal-hemiaminal linkage at the α end and non-covalently bonded to a second aminal-hemiaminal linkage at the ω end.

In other embodiments, a composition has a plurality of polymer chains, each having a first end and a second end, and a plurality of linkages having the structure:

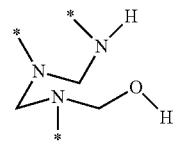

Each starred bond of each linkage may be a covalent bond to one of the plurality of the polymer chains. A first portion of the polymer chains may each be covalently bonded at a starred bond of a first linkage at the first end and covalently bonded at a starred bond of a second linkage at the second end. A second portion of the plurality of polymer chains may each be covalently bonded at a starred bond of a first linkage at the first end and inert or hydrogen bonded to a second linkage at the second end.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this present disclosure and are therefore not to be considered limiting of its scope, for the present disclosure may admit to other equally effective embodiments.

Figure 1A:
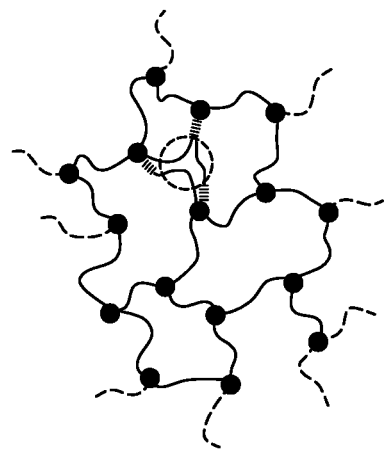
FIG. 1a illustrates HDCNs synthesized entirely from α,ω-diamino-functionalized-PEG, according to an embodiment.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments described herein generally relate to hemiaminal organogel networks (HDCNs) and methods of forming HDCNs. Compounds, compositions, and methods described herein generally involve hemiaminal organogel networks (HDCNs) that benefit from manipulating the equilibria involved in HDCN-forming reactions. Methods described herein may be used to trap hemiaminal covalent crosslink junctions and form non-covalent networks, leading to properties that are otherwise difficult to achieve using only covalent bonds. The combination of covalent bonding and non-covalent interactions (as a supramolecular bonding motif) enables the material to relax under load while still maintaining covalent stability. Non-covalent interactions may be realized by introducing network defects into the HDCN network.

In some embodiments, the use of an organic solvent, such as a polymerizable organic solvent or non-polymerizable solvent, to form the HDCNs allows incorporation of reactive/polymerizable compounds into a gel scaffold, which may affect the swelling behavior of an HDCN network. Organic solvents also help to stabilize HDCNs by, for example, providing a hydrogen bond accepting moiety for stabilization of a trimeric aminal-hemiaminal linkage. Polymerizable solvents include vinylogous solvents (such as N-vinyl pyrrolidone or styrene) and α,β-unsaturated carbonyl-containing solvents, such as methyl methacrylate. Organic solvents may include, for example, non-polymerizable polar aprotic solvents include, for example, N-methyl-pyrrolidone (NMP), dimethylsulfoxide (DMSO), N,N-dimethylformamide (DMF), N,N-dimethylacetamide (DMA), propylene carbonate (PC), and propylene glycol methyl ether acetate (PGMEA). In some embodiments, an organic solvent is present in an HDCN between about 1% to about 99% of the HDCN by volume, between about 30% to about 95%, between about 50% to about 95%, for example about 90%.

In some embodiments, HDCNs have a plurality of polymers, such as divalent polymers. Polymers comprise multiple monomeric units and may include one or more macromonomers and/or oligomers. In some embodiments, each polymer of a plurality of polymers has a polymer chain, a first end, such as an α end, and a second end, such as an ω end. One or both of the first end and the second end may be an amine, such as —NH$_2$. A polymer chain may be a vinyl chain, a polyether chain (such as polyethylene glycol (PEG) or polypropylene oxide (PPO)), a polyester chain, a polyimide chain, a polyamide chain, a polyurea chain, a polyurethane chain, a polyaryl ether sulfone chain, a polybenzoxazole chain, a polybenzimidazole chain, an epoxy resin, a polysiloxane chain, a polybutadiene chain, and butadiene copolymer, or a combination thereof.

In some embodiments, a first end and a second end of a polymer is functionalized. Scheme 1 illustrates one embodiment of HDCN formation having amine-terminated PEG oligomers with paraformaldehyde in N-Methyl pyrrolidone (NMP). As shown in Scheme 1, α,ω-diamino-functionalized PEG may be treated with equivalents of paraformaldehyde in an organic solvent, such as NMP, to form a product containing a hemiaminal crosslink. In this application, α is used to denote a first end of a molecule and ω is used to denote a second end of the molecule opposite from the first end. Thus, an "α, ω" functionalized molecule is a molecule that is functionalized at two opposite ends of the molecule, the "α" end and the "ω" end. Depending on the number of equivalents of paraformaldehyde and the reaction temperature, the ω chain end of the α,ω-diamino-functionalized-polymer may be further functionalized with a hydroxyl substituent to form an N—C—O—H moiety, which introduces a network 'defect' into the resultant HDCN network. In some embodiments, an HDCN may be formed at a temperature between about 30° C. to about 130° C., such as about 50° C. to about 110° C., for example about 110° C. In some embodiments, an HDCN may be formed using a stoichiometric excess of paraformaldehyde to an α,ω-diamino-functionalized polymer of about 1.1 equiv. to about 10 equiv., such as about 2.5 equiv. to about 4.4 equiv., for example about 4.4 equiv. HDCN compounds formed by, for example, using 4.4 equiv. of paraformaldehyde to α,ω-diamino-functionalized-polymer and heated to 110° C. form gels, for example, at room temperature.

Scheme 1.

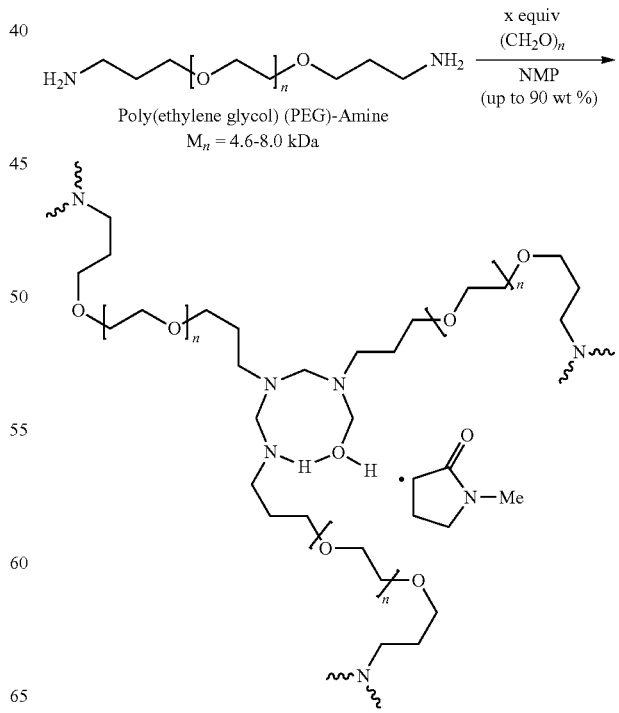

Figure 1B:
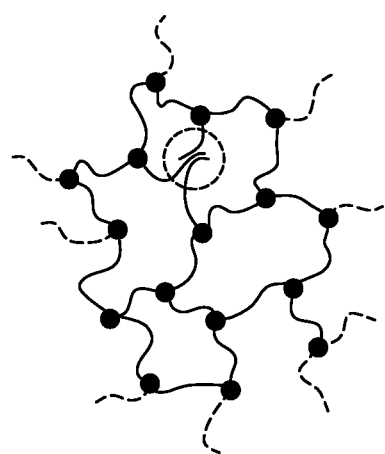
FIG. 1b illustrates HDCNs synthesized from a mixture of α,ω-diamino-functionalized PEG and α-amino-ω-x-functionalized PEG, where x is inert toward the surrounding HDCN network, according to an embodiment.
Figure 1C:
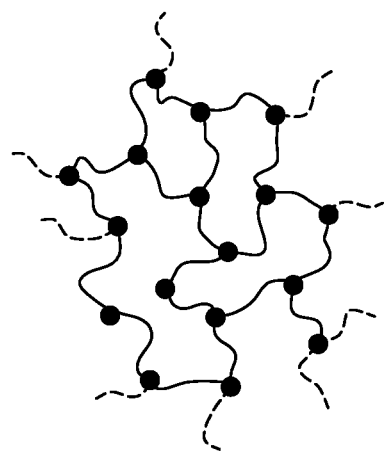
FIG. 1c illustrates HDCNs synthesized with a mixture of α,ω-diamino-functionalized PEG and α-amino-ω-x-functionalized PEG, where x can form physical interactions, such as hydrogen bonding, with a surrounding hemiaminal crosslink, according to an embodiment.

Alternatively, HDCN network 'defects' may also be formed in an HDCN network using a mixture of α,ω-diamino-functionalized polymer groups and α-amino-ω-x-functionalized polymer groups, where the mixture is reacted with paraformaldehyde under similar conditions described above. In the formulation above, "x" is a functional group that may interact with other parts of the HDCN network, and "α-amino-ω-x-functionalized" means that the polymer has an amino group at a first end of the polymer chain, the "α" end, and another functional group "x" at a second end of the polymer chain, the "ω" end, opposite the first end. After HDCN formation, the α-amino-ω-x-functionalized polymer has one chain end (α) covalently bonded to the network as, for example, a hemiaminal crosslink junction, while the ω chain end allows only inert or physical interactions, such as Van Der Waals interactions and/or hydrogen bonding, within the network. FIG. 1a illustrates HDCNs synthesized from exclusively α,ω-diamino-functionalized-polymers. As shown in FIG. 1a, each crosslink is a hemiaminal, i.e., covalent interactions predominate the HDCN network. FIG. 1b illustrates HDCNs synthesized from a mixture of α,ω-diamino-functionalized polymer and α-amino-ω-x-functionalized polymer, where x is inert toward the surrounding HDCN network. As shown in FIG. 1b, the ω end of the α-amino-ω-x-functionalized polymers present in the HDCN network exhibits only inert interactions, such as Van Der Waals interactions, with other parts of the HDCN network. FIG. 1c illustrates HDCNs synthesized with a mixture of α,ω-diamino-functionalized polymer and α-amino-ω-x-functionalized polymer, where x can form physical interactions, such as hydrogen bonding, with a surrounding hemiaminal crosslink. As shown in FIG. 1c, the ω end of an α-amino-ω-x-functionalized polymer present in the HDCN network can interact with a hemiaminal crosslink using non-covalent, physical interactions such as hydrogen bonding.

The identity of the functional moieties introduced at an ω chain end of the α-amino-ω-x-functionalized polymer allows for control of the inert and physical interactions of the ω chain with the rest of the surrounding HDCN network. In some embodiments, x may be a non-interacting (non-reactive) functional group that does not comprise an amine or alcohol. In some embodiments, x is alkoxy, such as methoxy, resulting in the ω chain end being 'inert' towards the HDCN network, where Van Der Waals forces between polymer chains are the dominant interactions between the ω side chain and other portions of the HDCN network, as shown in FIG. 1b. In some embodiments, x may have one or more hydroxyl moieties, and hydrogen bonds may be formed with a crosslink, as shown in FIG. 1c. As described above, hydroxyl moieties may be realized by, for example, reacting an amino substituent with excess formaldehyde. Non-covalent interactions, i.e. Van Der Waals interactions and/or hydrogen bonding, are interactions that may be broken and readily reformed due to the low bonding energies involved as compared to the energies involved with breaking covalent bonds, such as a majority of the bonds present in a hemiaminal crosslink. Moieties configured for non-covalent interactions may also be "unbonded" with respect to the surrounding HDCN network, e.g., they do not interact via covalent bonds, Van Der Waals interactions and/or hydrogen bonding with the surrounding HDCN network.

In some embodiments, the ratio of α,ω-diamino-functionalized polymer to α-amino-ω-x-functionalized polymer may be adjusted, allowing for control of the crosslinking density of the network. For example, increasing the ratio of α,ω-diamino-functionalized polymer to α-amino-ω-x-functionalized polymer will increase the covalent bonds present in the HDCN network, while decreasing the ratio of α,ω-diamino-functionalized polymer to α-amino-ω-x-functionalized polymer will increase network 'defects' such as non-covalent interactions, e.g., hydrogen bonding and/or Van Der Waals interactions, present in the HDCN network. Due to the lower energy involved to interrupt the non-covalent interactions as compared to the energy involved to interrupt covalent bonds, an increase in network 'defects' in the HDCN network provides improved viscoelastic properties of the resultant organogel, as compared to the viscoelastic properties of an HDCN having exclusively trivalent aminal-hemiaminal crosslinks at a first end and a second end of each polymer chain of the plurality of polymer chains of the HDCN. In some embodiments, an HDCN composition may have a ratio of α,ω-diamino-functionalized polymer chains to α-amino-ω-x-functionalized polymer chains between about 1:99 to about 99:1, such as about 1:10 to about 50:1, such as about 1:1 to about 20:1, for example about 4:1.

In some embodiments, polymer chains, such as PEG chains, of the α,ω-diamino-functionalized polymer and α-amino-ω-x-functionalized polymer may have number average molecular weight (Mn) between about 2 kiloDaltons (kDa) to about 10 kDa, such as about 4.6 kDa to about 8 kDa. Increasing the Mn of an α,ω-diamino-functionalized polymer chain decreases the storage modulus (G') of an HDCN network because the crosslinking density is lower. In contrast, increasing the Mn of an α-amino-ω-x-functionalized polymer chain increases the storage modulus (G') of the HDCN because the non-covalently bonded ω chain is more entangled than that of an HDCN formed from exclusively α,ω-diamino-functionalized polymer.

As described above, hydroxyl moieties may be introduced to the ω end of an α,ω-diamino-functionalized polymer by adjusting the reaction temperature and equivalents of paraformaldehyde. Scheme 2 illustrates an alternative method for introducing hydroxyl moieties to the ω end of an α,ω-diamino-functionalized polymer by nucleophilic substitution of the nucleophilic ω end amine with electrophilic 2-bromoethanol (to form an alcohol, such as a mono-ol) or epoxide opening of electrophilic glycidol (to form an alcohol, such as a diol). As shown in Scheme 2, 2-bromoethanol may be utilized to introduce one hydroxyl group to a ω-amino substituent to form a mono-ol, whereas glycidol may be utilized to introduce two hydroxyl groups to a ω-amino substituent to form a diol. Furthermore, the stoichiometry of 2-bromoethanol or glycidol versus α,ω-diamino-functionalized polymer may determine the final amount of α,ω-diamino-functionalized polymer versus α-amino-ω-hydroxy-functionalized polymer. For example, adding a substoichiometric amount of 2-bromoethanol to α,ω-diamino-functionalized polymer will yield a product mixture containing at least some α-amino-ω-alcohol-functionalized polymer along with unreacted α,ω-diamino-functionalized polymer starting material. In some embodiments, α-amino-ω-hydroxy-functionalized polymer is present in a product mixture from about 1% to about 100%, such as about 5% to about 50%, for example about 20%. Addition of a polymerizable organic solvent or non-polymerizable organic solvent, such as NMP, to the product mixture results in HDCN formation. Functionalization of α,ω-diamino-functionalized polymer with glycidol leads to ω chain ends mimicking the species observed as described above, e.g., while an HDCN is synthesized at high temperature (e.g., 110° C.) with superstoichiometric amounts of paraformaldehyde. As a result, the HDCN formed from glycidol is a tough elastomeric gel. Furthermore, the 2-bromoethanol reactions may be performed at about room temperature while the glycidol reactions may be performed at about 50° C.

Scheme 2.

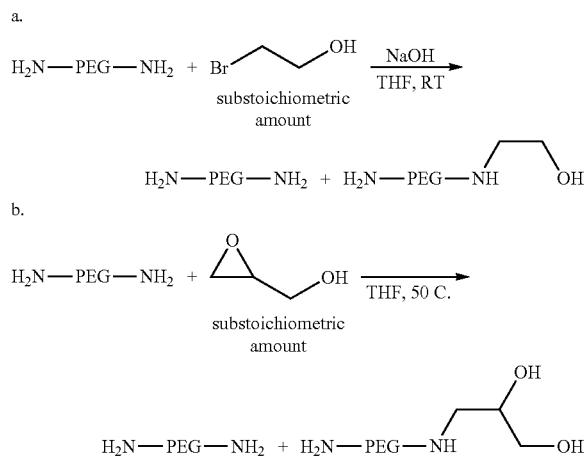

By varying the crosslinking density of the HDCN network and/or the ω-functionality of the α-amino-ω-functionalized polymer, the storage modulus (G') and loss modulus (G") of an HDCN network can be tailored. As a result, the mechanical properties of the HDCN can be finely tuned to create elastomeric HDCNs due to the combination of both covalent crosslinking and non-covalent interactions in the same material.

Figure 2:
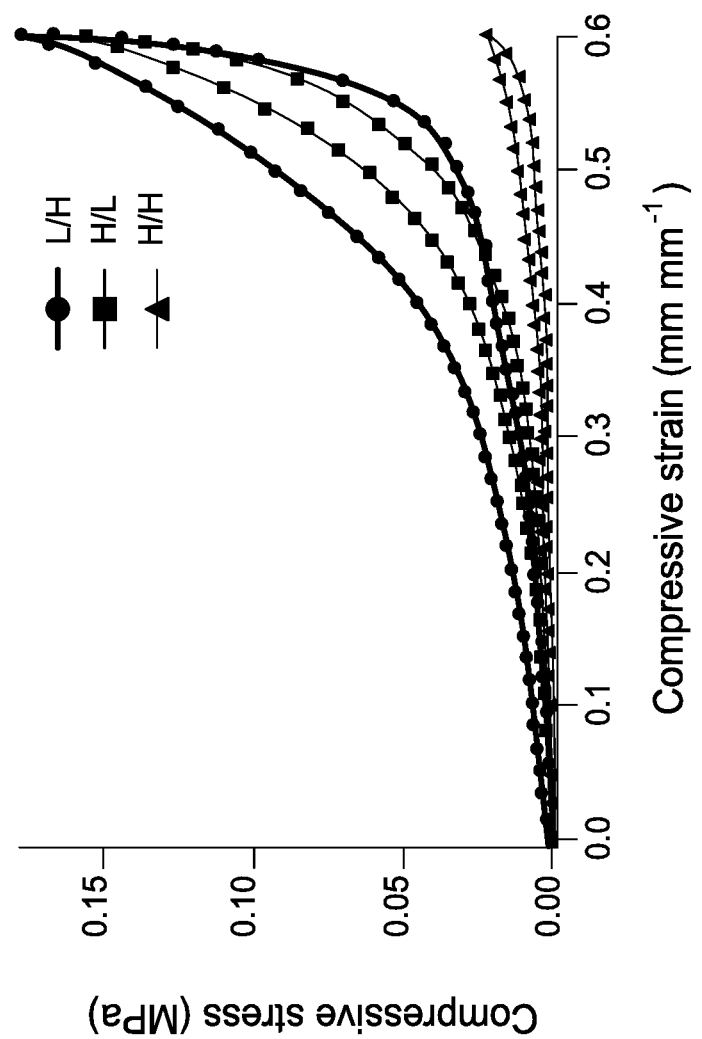
FIG. 2 illustrates mechanical properties (hysteresis behavior) of HDCN organogels synthesized under various reaction conditions, according to an embodiment.

In some embodiments, the mechanical properties of an HDCN may be controlled by the reaction conditions used to produce an HDCN. FIG. 2 illustrates mechanical properties (hysteresis behavior) of HDCN organogels synthesized under various reaction conditions. HDCN gels may be linearly deformed at a rate of 0.1 (mm mm-1) per minute over a strain range within the elastic deformation regime (<60% strain). HDCN gels exhibit elastomeric behavior when strained <0.6 mm mm-1; the hysteresis curves indicate that no residual strain was present in the network after each test. HDCN gels exhibit hysteresis behavior, and the energy dissipated by the load-unload cycles may be measured by calculating the area between the load-unload curves.

As shown in FIG. 2, the mechanical properties of an HDCN are correlated with the reaction conditions used to produce the HDCN. HDCN 204 (synthesized at 110° C. with 2.5 equiv. paraformaldehyde) has modulus values comparable to HDCN 206 (synthesized at 50° C. with 4.4 equiv. paraformaldehyde). The modulus of HDCN 202 (synthesized at 110° C. with 4.4 equiv. paraformaldehyde) is an order of magnitude lower than the modulus of gels synthesized at lower temperatures.

Temperature-dependent mechanical properties of HDCNs 204 and 202 may be characterized by gradually cooling HDCNs from the reaction temperature (110° C.). A sol-gel transition is observed for HDCN 202 near T=87.5° C. (G'~G"~$\omega^d$), while the storage modulus (G') of HDCN 204 increases as the reaction mixture is cooled. HDCN 204 exhibits gelation (G'>G") at T=100° C. HDCNs 202 and 204 form an elastomeric material after the gel has cooled to 80° C.

Figure 3A:
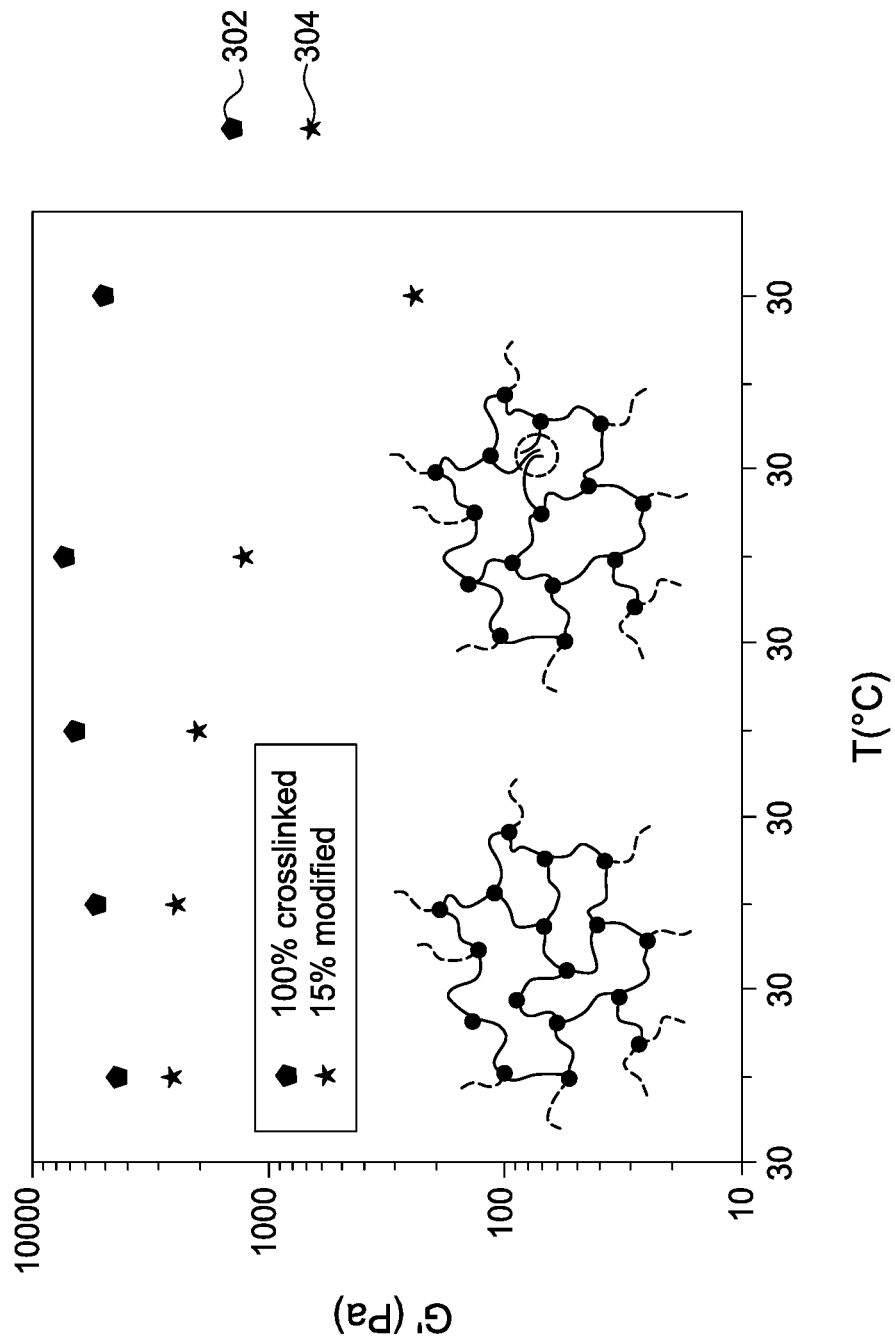
FIG. 3a illustrates the temperature-dependence of storage modulus (G') of an HDCN comprising a plurality of exclusively NH2-PEG4.6 kD-NH2 polymers and an HDCN comprising a plurality of 85% NH2-PEG4.6 kD-NH2 polymers in addition to a plurality of 15% MeO-PEG2 kD-NH2 polymers.
Figure 3B:
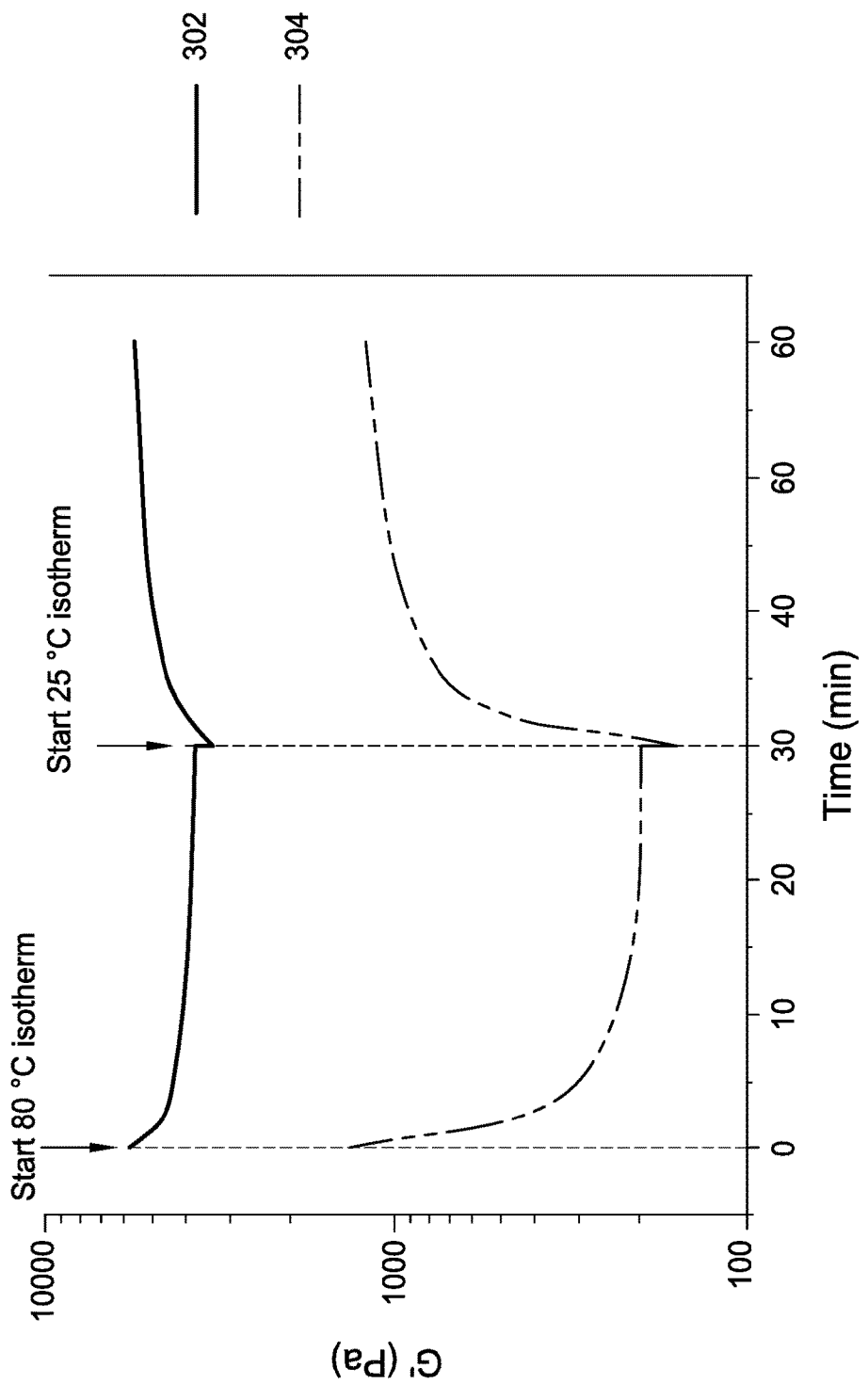
FIG. 3b illustrates the change in storage modulus of HDCNs upon treating the HDCNs with isotherms.

FIG. 3a illustrates the temperature-dependence of storage modulus (G') of an HDCN comprising a plurality of exclusively NH2-PEG4.6 kDa-NH2 polymers (HDCN 302) and an HDCN comprising a plurality of 85% NH2-PEG4.6 kDa-NH2 polymers in addition to a plurality of 15% MeO-PEG2 kD-NH2 polymers (HDCN 304). The —NH2 moieties of each of HDCN 302 and 304 can form a trivalent aminal-hemiaminal crosslink within the HDCN upon treatment with paraformaldehyde. The —OMe moiety of HDCN 304, however, is non-covalently bonded to the surrounding HDCN network and forms inert interactions within HDCN 304. As shown in FIG. 3a, the storage modulus (G') of HDCN 304 is lower than the storage modulus of HDCN 302 across a broad range of temperatures. Furthermore, the storage modulus of HDCN 304 decreases as a function of temperature, i.e. as temperature increases. At, for example, 80° C., the storage modulus of HDCN 304 is an order of magnitude lower than the storage modulus of HDCN 302. The decrease in storage modulus upon increased temperature allows for melt-processing of, for example, HDCN 304. FIG. 3b illustrates the change in storage modulus of HDCNs 302 and 304 upon subjecting the HDCNs to isotherms. As shown in FIG. 3b, the storage modulus of HDCN 304 substantially decreases, as compared to the storage modulus of HDCN 302, upon subjecting each of HDCNs 302 and 304 to an 80° C. isotherm for 30 minutes. Each of HDCNs 302 and 304 was then subjected to a 25° C. isotherm for 30 minutes. The storage modulus of HDCN 304 substantially increases, as compared to the storage modulus of HDCN 302, upon subjecting the HDCNs 302 and 304 to a 25° C. isotherm. These data further illustrate the improved melt-processing capabilities of HDCNs having one or more network defects, as compared to HDCNs having exclusively covalent crosslink junctions.

Overall, HDCNs synthesized with about stoichiometric quantities of paraformaldehyde with respect to each amine end group of a polymer form reversible hemiaminal linkages. Viscoelastic properties and melt-processing capabilities of HDCNs, for example, synthesized at 110° C. and 4.4 equiv. of paraformaldehyde may be attributed to a mixture of hemiaminal linkages in combination with hydrogen bonding capability at a polymer (I) end, which leads to the formation of hydrogen bonds between (I) chain ends and, for example, hemiaminal crosslink junctions. The (I) end-capped dangling chains described herein may form network 'defects', e.g., supramolecular, non-covalent interactions. Furthermore, HDCN syntheses described herein may be performed at lower temperatures than conventional syntheses, allowing for reduced energy costs and reduced degradation of polymerizable solvents.

HDCNs described herein allow for a thermoset, polymer-based organogel that exhibits dynamic covalent behavior. The dynamic covalent behavior of crosslink junctions allows unique temperature-dependent mechanical behavior, resulting in a rubbery, strain-hardening elastomer at low temperatures. Furthermore, HDCNs having one or more network defects allows for improved melt-processing capability, as compared to HDCNs having exclusively covalent crosslinks. The HDCNs described herein allow for dynamic applicability in the areas of 3D-printing, sealants, composite repair, among others.

The present disclosure has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and their practical application, and to enable others of ordinary skill in the art to understand the embodiments.

What is claimed is:

1. A hemiaminal organogel, comprising:
a plurality of polymer chains, each having an α end and an ω end; and
a plurality of aminal-hemiaminal linkages, wherein a first portion of the plurality of polymer chains is each covalently bonded to a first aminal-hemiaminal linkage at the α end and a second aminal-hemiaminal linkage at the ω end, and a second portion of the plurality of the polymer chains is each covalently bonded to a first aminal-hemiaminal linkage at the α end and non-covalently bonded to a second aminal-hemiaminal linkage at the ω end.

2. The hemiaminal organogel of claim 1, further comprising an organic solvent that is N-methyl pyrrolidone.

3. The hemiaminal organogel of claim 1, further comprising an organic solvent that is polymerizable and is N-vinyl pyrrolidone.

4. The hemiaminal organogel of claim 1, wherein the ω end of one or more polymer of the plurality of polymer chains is alkoxyl.

5. The hemiaminal organogel of claim 1, wherein the ω end of one or more polymer of the plurality of polymer chains is hydroxyl.

6. The hemiaminal organogel of claim 1, wherein one or more polymer chain of the plurality of polymer chains is polyethylene glycol.

7. A composition, comprising:
a plurality of polymer chains, each having a first end and a second end; and
a plurality of linkages having the structure

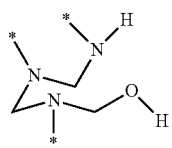 [SMILES: *NCN(*)CN(*)CO]

wherein each starred bond of each linkage is a covalent bond to one of the plurality of the polymer chains, a first portion of the polymer chains is each covalently bonded at a starred bond of a first linkage at the first end and covalently bonded at a starred bond of a second linkage at the second end, and a second portion of the plurality of polymer chains is each covalently bonded at a starred bond of a first linkage at the first end and inert or hydrogen bonded to a second linkage at the second end.

8. The composition of claim 7, further comprising an organic solvent that is N-methyl pyrrolidone.

9. The composition of claim 7, further comprising an organic solvent that is polymerizable and is N-vinyl pyrrolidone.

10. The composition of claim 7, wherein the second end of one or more polymer of the second portion of the plurality of polymer chains is alkoxyl.

11. The composition of claim 7, wherein the second end of one or more polymer of the second portion of the plurality of polymer chains is hydroxyl.

12. The composition of claim 7, wherein one or more polymer chain of the plurality of polymer chains is polyethylene glycol.

13. A hemiaminal organogel, comprising:
a first polymer having a first end bonded to a trivalent aminal-hemiaminal and having a second end bonded to a trivalent aminal-hemiaminal; and
a second polymer having a first end bonded to a trivalent aminal-hemiaminal and a second end that is selected from alkoxyl or hydroxyl.

14. The hemiaminal organogel of claim 13, wherein the second end of the second polymer is hydroxyl that is a mono-ol or a diol.

15. The hemiaminal organogel of claim 13, wherein the second end of the second polymer is alkoxyl that is methoxy.

16. The hemiaminal organogel of claim 13, wherein the first polymer is polyethylene glycol.

17. The hemiaminal organogel of claim 16, wherein the first polymer has a number average molecular weight (Mn) of about 4.6 kDa to about 8 kDa.

18. The hemiaminal organogel of claim 17, wherein the second polymer is polyethylene glycol.

19. The hemiaminal organogel of claim 18, wherein the second polymer has a number average molecular weight (Mn) of about 4.6 kDa to about 8 kDa.

20. The hemiaminal organogel of claim 13, wherein the hemiaminal organogel further comprises an organic solvent, and a volume fraction of the organic solvent in the hemiaminal organogel is from about 50% by volume to about 95% by volume.

* * * * *